United States Patent [19]

Moriya et al.

[11] Patent Number: 5,835,489
[45] Date of Patent: Nov. 10, 1998

[54] CDMA COMMUNICATION SYSTEM

[75] Inventors: Masahiro Moriya; Osamu Kato, both of Yokohama, Japan

[73] Assignee: Matsushita Electric Industrial Co., Ltd., Osaka, Japan

[21] Appl. No.: 380,404

[22] Filed: Jan. 30, 1995

[30] Foreign Application Priority Data

Jan. 31, 1994 [JP] Japan .................................. 6-009612

[51] Int. Cl.⁶ .................................................... H04J 13/00
[52] U.S. Cl. ........................ 370/342; 370/335; 370/503; 375/205
[58] Field of Search ...................................... 370/277, 320, 370/335, 342, 350, 503, 509; 375/200, 208, 344, 354, 362, 205

[56] References Cited

U.S. PATENT DOCUMENTS

| | | | |
|---|---|---|---|
| 5,444,708 | 8/1995 | Shimizu ................................... | 370/350 |
| 5,446,727 | 8/1995 | Bruckert et al. ......................... | 370/350 |
| 5,559,789 | 9/1996 | Nakano et al. .......................... | 370/342 |
| 5,663,956 | 9/1997 | Schilling ................................. | 370/342 |

FOREIGN PATENT DOCUMENTS

1186027  7/1989  Japan .

*Primary Examiner*—Douglas W. Olms
*Assistant Examiner*—Shick Hom
*Attorney, Agent, or Firm*—Pollock, Vande Sande & Priddy

[57] ABSTRACT

A CDMA communication system includes a base station and a mobile station. The base station transmits a first spread spectrum signal which contains information and a reference signal for synchronization. The mobile station receives the first spread spectrum signal from the base station. The mobile station includes a section for removing the reference signal from the received first spread spectrum signal and converting the received first spread spectrum signal into a second spread spectrum signal, and a section for despreading the second spread spectrum signal and recovering the information from the second spread spectrum signal.

4 Claims, 4 Drawing Sheets

CDMA COMMUNICATION SYSTEM

BACKGROUND OF THE INVENTION

1. Field of the Invention

This invention relates to a CDMA (code division multiple access) communication system.

2. Description of the Prior Art

In a typical CDMA communication system, a base station can communicate with mobile stations to which different pseudo-noise codes (spread codes) are assigned respectively. In the base station, base-band information pieces to be transmitted to the mobile stations are modulated in response to the pseudo-noise codes respectively before being combined and multiplexed into a composite information signal. Then, a carrier is modulated in response to the composite information signal. The base station transmits the resultant modulated carrier toward the mobile stations via a downlink. Each of the mobile stations receives the modulated carrier. At each of the mobile stations, the composite information signal is recovered from the received carrier, and then the composite information signal is demodulated into the related base-band information piece in response to the assigned pseudo-noise code.

Each of the mobile stations includes a generator for producing the assigned pseudo-noise code. To accurately recover the related base-band information piece, it is necessary to acquire the synchronization between the produced pseudo-noise code and the pseudo-nose code contained in the received carrier.

SUMMARY OF THE INVENTION

It is an object of this invention to provide an improved CDMA communication system.

A first aspect of this invention provides a CDMA communication system comprising a base station transmitting a first spread spectrum signal which contains information and a reference signal for synchronization; and a mobile station receiving the first spread spectrum signal from the base station; wherein the mobile station comprises means for removing the reference signal from the received first spread spectrum signal and converting the received first spread spectrum signal into a second spread spectrum signal, and means for despreading the second spread spectrum signal and recovering the information from the second spread spectrum signal.

A second aspect of this invention provides a CDMA communication system comprising a base station transmitting a first spread spectrum signal which contains information and a first reference signal for synchronization; and a mobile station receiving the first spread spectrum signal from the base station; wherein the mobile station comprises means for generating a second reference signal corresponding to the first reference signal, means for detecting a degree of correlation between the received first spread spectrum signal and the second reference signal, means for weighting the second reference signal in response to the detected degree of correlation and converting the second reference signal into a third reference signal, means for subtracting the third reference signal from the received first spread spectrum signal and converting the received first spread spectrum signal into a second spread spectrum signal, and means for despreading the second spread spectrum signal and recovering the information from the second spread spectrum signal.

A third aspect of this invention provides a mobile-station receiver in a CDMA communication system including a base station transmitting a first spread spectrum signal which contains information and a reference signal for synchronization, the mobile-station receiver comprising means for receiving the first spread spectrum signal from the base station; means for removing the reference signal from the received first spread spectrum signal and converting the received first spread spectrum signal into a second spread spectrum signal; and means for despreading the second spread spectrum signal and recovering the information from the second spread spectrum signal.

A fourth aspect of this invention provides a mobile-station receiver in a CDMA communication system including a base station transmitting a first spread spectrum signal which contains information and a first reference signal for synchronization, the mobile-station receiver comprising means for receiving the first spread spectrum signal from the base station; means for generating a second reference signal corresponding to the first reference signal; means for detecting a degree of correlation between the received first spread spectrum signal and the second reference signal; means for weighting the second reference signal in response to the detected degree of correlation and converting the second reference signal into a third reference signal; means for subtracting the third reference signal from the received first spread spectrum signal and converting the received first spread spectrum signal into a second spread spectrum signal; and means for despreading the second spread spectrum signal and recovering the information from the second spread spectrum signal.

DESCRIPTION OF THE PREFERRED EMBODIMENTS

Before a detailed description of this invention, a background-art CDMA communication system will be described for a better understanding of this invention.

Figure 1:
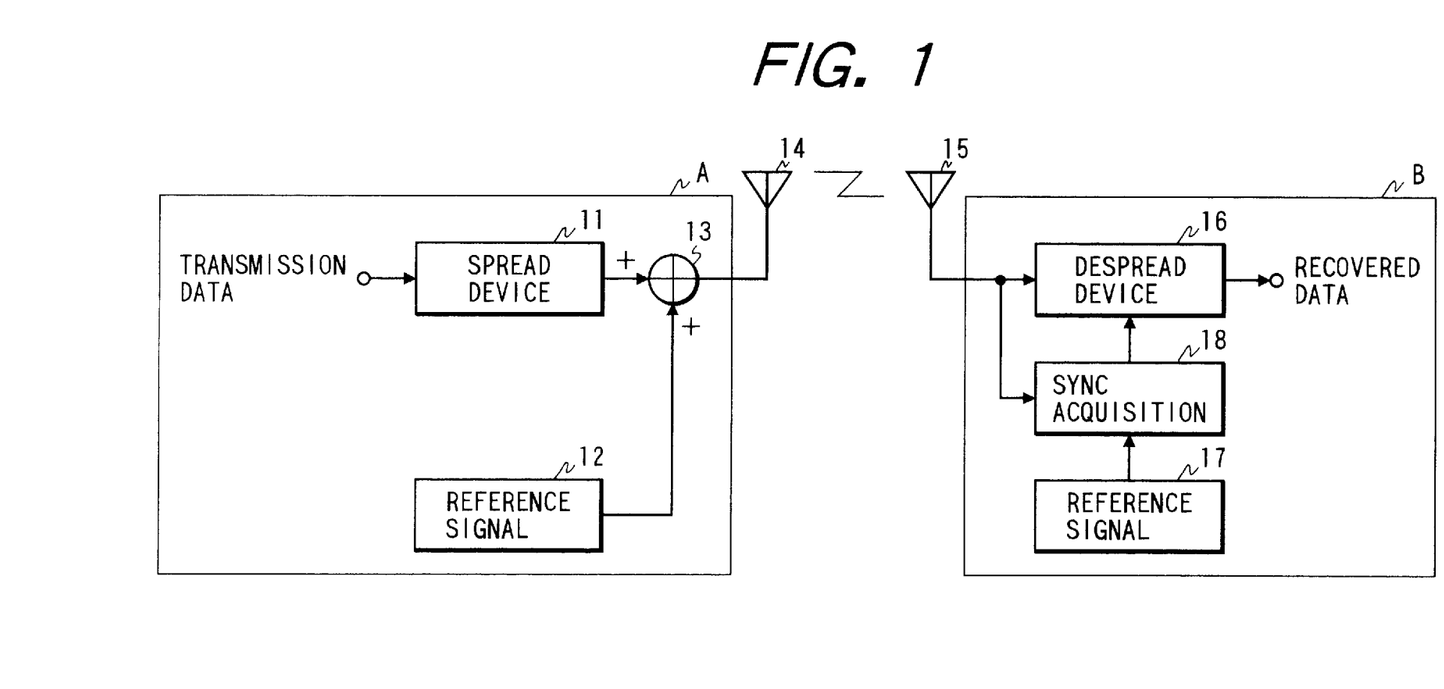
FIG. 1 is a diagram of a background-art CDMA communication system.

FIG. 1 shows a background-art CDMA communication system which includes a base station provided with a transmitter "A".

There are a plurality of mobile stations each having a receiver "B". It should be noted that FIG. 1 indicates only one of the mobile-station receivers "B".

In the background-art system of FIG. 1, the base-station transmitter "A" includes a spreading device 11, a reference signal generator 12, and an adder 13. Transmission data pieces, that is, information pieces to be transmitted and addressed to the respective mobile stations, are fed to the spreading device 11.

The spreading device 11 includes pseudo-noise code generators (spread code generators) for producing different pseudo-noise codes (spread codes) assigned to the mobile stations respectively. For example, the produced spread codes are selected from among maximum length codes (maximum length sequences). The spreading device 11 includes multipliers (mixers or modulators) which convert the information pieces into spread spectrum signals in response to the spread codes respectively. The spreading device 11 includes a summing circuit or an adder which combines the spread spectrum signals into a first composite spread spectrum signal. The spreading device 11 outputs the first composite spread spectrum signal to the adder 13.

The reference signal generator 12 produces a reference signal synchronous with the spread codes generated in the spreading device 11. The reference signal has a predetermined period which is in a given relation with the period of the spread codes. The reference signal is used for providing synchronization among all transmitters and receivers in the communication system. The reference signal is common to all the mobile stations while the spread codes are assigned to the mobile stations respectively. The reference signal generator 12 outputs the reference signal to the adder 13.

It is good that the reference signal has small degrees of correlations with the spread codes at all phase differences from the spread codes. For example, the reference signal is selected from among preferred pair maximum length codes.

The adder 13 combines the first composite spread spectrum signal and the reference signal into a second composite spread spectrum signal. The second composite spread spectrum signal is fed from the adder 13 to an antenna 14 via an RF (radio frequency) modulator (not shown) before being radiated by the antenna 14.

In the background-art system of FIG. 1, the mobile-station receiver "B" includes a despreading device 16, a reference signal generator 17, and a sync acquisition device 18. The second composite spread spectrum signal transmitted from the base-station transmitter "A" is caught by an antenna 15, and is then fed from the antenna 15 to the despreading device 16 and the sync acquisition device 18 via an RF demodulator (not shown).

The reference signal generator 17 produces a reference signal equivalent or corresponding to the transmitter-side reference signal. The reference signal generator 17 outputs the reference signal to the sync acquisition device 18.

For example, the sync acquisition device 18 includes a phase shifter (a delay circuit), a correlator, a peak detector, and a sync clock signal generator. The phase shifter continuously varies the phase of the reference signal, and thereby converts the reference signal into a phase-shifted reference signal. The correlator detects the degree of correlation between the second composite spread spectrum signal and the phase-shifted reference signal. When the phase-shifted reference signal matches in phase with the reference signal contained in the second composite spread spectrum signal, the degree of correlation between the second composite spread spectrum signal and the phase-shifted reference signal is maximized so that the output signal of the correlator peaks. The peak detector responds to the output signal of the correlator. The peak detector outputs a control signal to the sync clock signal generator when the output signal of the correlator peaks. The sync clock signal generator produces a sync clock signal in response to the control signal. The sync clock signal generator outputs the sync clock signal to the despreading device 16.

The despreading device 16 includes a pseudo-noise code generator (a spread code generator) for producing the pseudo-noise code (the spread code) assigned to the related mobile station. The pseudo-noise code generator responds to the sync clock signal fed from the sync acquisition device 18. As a result, the produced pseudo-noise code is synchronized with the transmitter-side pseudo-noise code. The despreading device 16 includes a multiplier (a mixer or demodulator) which despreads and converts the second composite spread spectrum signal into the information piece in response to the pseudo-noise code. In this way, the information piece is recovered from the second composite spread spectrum signal. The recovered information piece is related to the spread code assigned to the present mobile station, and is thus addressed to the present mobile station. The despreading device 16 outputs the recovered information piece.

In the mobile-station receiver "B" of the background-art system of FIG. 1, the reference signal contained in the second composite spread spectrum signal has a certain degree of correlation with the spread code used in the despreading device 16. Such a correlation tends to lower the accuracy of the recovered information piece.

FIRST EMBODIMENT

Figure 2:
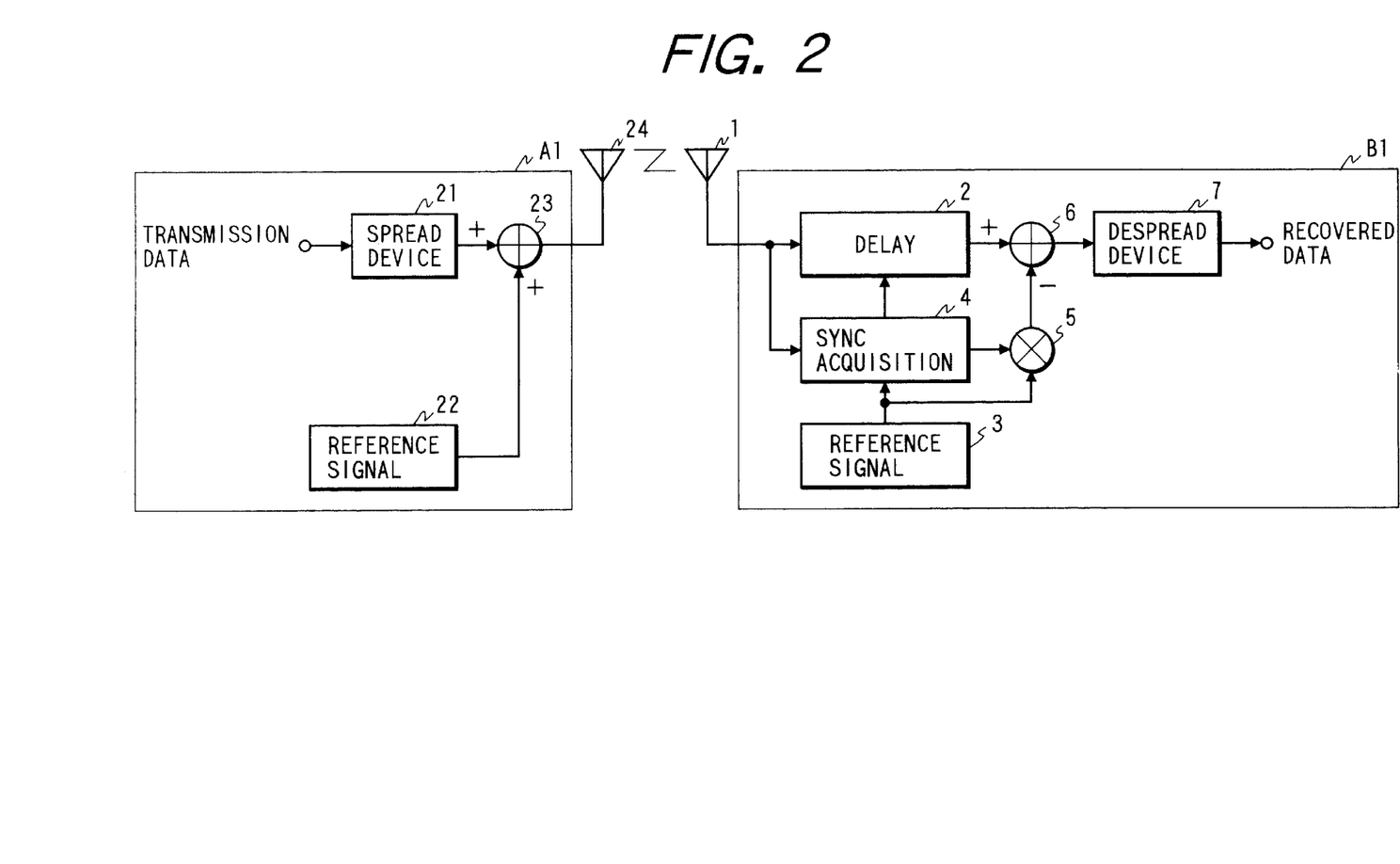
FIG. 2 is a diagram of a CDMA communication system according to a first embodiment of this invention.

With reference to FIG. 2, a CDMA communication system includes a base station provided with a transmitter "A1". There are a plurality of mobile stations each having a receiver "B1". It should be noted that FIG. 2 indicates only one of the mobile-station receivers "B1".

In the system of FIG. 2, the base-station transmitter "A1" includes a spreading device 21, a reference signal generator 22, and an adder 23. Transmission data pieces, that is, information pieces to be transmitted and addressed to the respective mobile stations, are fed to the spreading device 21.

The spreading device 21 includes pseudo-noise code generators (spread code generators) for producing different pseudonoise codes (spread codes) assigned to the mobile stations respectively. For example, the produced spread codes are selected from among maximum length codes (maximum length sequences). The spreading device 21 includes multipliers (mixers or modulators) which convert the information pieces into spread spectrum signals in response to the spread codes respectively. The spreading device 21 includes a summing circuit or an adder which combines the spread spectrum signals into a first composite spread spectrum signal. The spreading device 21 outputs the first composite spread spectrum signal to the adder 23.

The reference signal generator 22 produces a reference signal synchronous with the spread codes generated in the spreading device 21. The reference signal has a predetermined period which is in a given relation with the period of the spread codes. The reference signal is used for providing synchronization among all transmitters and receivers in the communication system. The reference signal is common to all the mobile stations while the spread codes are assigned to the mobile stations respectively. The reference signal generator 22 outputs the reference signal to the adder 23.

It is good that the reference signal has small degrees of correlations with the spread codes at all phase differences from the spread codes. For example, the reference signal is selected from among preferred pair maximum length codes.

The adder 23 combines the first composite spread spectrum signal and the reference signal into a second composite spread spectrum signal. The second composite spread spectrum signal is fed from the adder 23 to an antenna 24 via an RF (radio frequency) modulator (not shown) before being radiated by the antenna 24.

In the system of FIG. 2, the mobile-station receiver "B1" includes a delay device 2, a reference signal generator 3, a sync acquisition device 4, a multiplier 5, a subtracter 6, and a despreading device 7. The second composite spread spectrum signal transmitted from the base-station transmitter "A1" is caught by an antenna 1, and is then fed from the antenna 1 to the delay device 2 and the sync acquisition device 4 via an RF demodulator (not shown).

The reference signal generator 3 produces a reference signal equivalent or corresponding to the transmitter-side reference signal. The produced reference signal is synchronous with a pseudo-noise code used in the despreading device 7. The reference signal generator 3 outputs the reference signal to the sync acquisition device 4 and the multiplier 5.

For example, the sync acquisition device 4 includes a phase shifter (a delay circuit), a correlator, a peak detector, and a sync clock signal generator. The phase shifter continuously varies the phase of the reference signal, and thereby converts the reference signal into a phase-shifted reference signal. The correlator detects the degree of correlation between the second composite spread spectrum signal and the phase-shifted reference signal. When the phase-shifted reference signal matches in phase with the reference signal contained in the second composite spread spectrum signal, the degree of correlation between the second composite spread spectrum signal and the phase-shifted reference signal is maximized so that the output signal of the correlator peaks. The peak detector responds to the output signal of the correlator. The peak detector outputs a control signal to the sync clock signal generator when the output signal of the correlator peaks. The sync clock signal generator produces a sync clock signal in response to the control signal.

The sync acquisition device 4 also includes a section for detecting the phase difference between the reference signal in the second composite spread spectrum signal and the reference signal from the reference signal generator 3 by referring to the sync clock signal and a signal representative of the conditions of the phase shifter. This section in the sync acquisition device 4 generates a delay control signal in response to the detected phase difference. The delay control signal is outputted to the delay device 2.

The sync acquisition device 4 further includes a weight coefficient generator which produces a signal of a weight coefficient in response to an output signal of the peak detector. The weight coefficient generator outputs the weight coefficient signal to the multiplier 5. The peak detector in the sync acquisition device 4 has the function of detecting the maximum (peak) degree of correlation between the second composite spread spectrum signal and the phase-shifted reference signal. The weight coefficient represented by the output signal of the weight coefficient generator depends on the maximum correlation degree detected by the peak detector.

The device 5 multiplies the reference signal and the weight coefficient signal, controlling a gain with respect to the reference signal in accordance with the weight coefficient represented by the weight coefficient signal. Thus, the multiplier 5 converts the reference signal into a level-adjusted reference signal in response to the weight coefficient signal. The multiplier 5 outputs the leveladjusted reference signal to the subtracter 6.

The delay device 2 is of the variable type. The device 2 delays the second composite spread spectrum signal in response to the delay control signal fed from the sync acquisition device 4. Specifically, the second composite spread spectrum signal is delayed by a time corresponding to the phase difference represented by the delay control signal. Thus, the delay device 2 converts the second composite spread spectrum signal into a delay-resultant signal which is referred to as a third composite spread spectrum signal. As a result of the operation of the delay device 2, the third composite spread spectrum signal is synchronized with the level-adjusted reference signal and the spread code used in the despreading device 7. The delay device 2 outputs the third composite spread spectrum signal to the subtracter 6.

The device 6 subtracts the level-adjusted reference signal from the third composite spread spectrum signal, thereby removing the reference-signal components from the third composite spread spectrum signal. In other words, the subtracter 6 converts the third composite spread spectrum signal into a fourth composite spread spectrum signal which is substantially free from components related to the reference signal. The subtracter 6 outputs the fourth composite spread spectrum signal to the despreading device 7.

The despreading device 7 includes a pseudo-noise code generator (a spread code generator) for producing the pseudo-noise code (the spread code) assigned to the related mobile station. The produced pseudo-noise code is synchronous with the reference signal generated by the reference signal generator 3. The despreading device 7 includes a multiplier (a mixer or demodulator) which despreads and converts the fourth composite spread spectrum signal into the information piece in response to the pseudo-noise code. In this way, the information piece is recovered from the second composite spread spectrum signal. The recovered information piece is related to the spread code assigned to the present mobile station, and is thus addressed to the present mobile station. The despreading device 7 outputs the recovered information piece.

As understood from the previous description, the sync acquisition device 4 detects the phase error between the received composite spread spectrum signal and the reference signal generated by the reference signal generator 3. The sync acquisition device 4 generates the delay control signal in response to the detected phase error, and outputs the delay control signal to the delay device 2. The device 2 delays the received composite spread spectrum signal in response to the delay control signal so that the phase error between the received composite spread spectrum signal and the reference signal generated by the reference signal generator 3 is canceled. Thus, the composite spread spectrum signal is synchronized with the reference signal generated by the reference signal generator 3 and the pseudo-noise code used in the despreading device 7.

In addition, the sync acquisition device 4 detects the maximum degree of correlation between the received composite spread spectrum signal and the reference signal generated by the reference signal generator 3. The sync acquisition device 4 generates the weight coefficient in response to the detected maximum degree of correlation. The sync acquisition device 4 outputs information of the generated weight coefficient to the multiplier 5. The multiplier 5 receives the reference signal from the reference signal generator 3. The multiplier 5 converts the received reference signal into the level-adjusted reference signal in response to the weight coefficient. The multiplier 5 outputs the level-adjusted reference signal to the subtracter 6. The device 6 subtracts the level-adjusted reference signal from the composite spread spectrum signal outputted by the delay device 2 so that the reference-signal components are removed from the composite spread spectrum signal.

Since the subtracter 6 removes the reference-signal components from the composite spread spectrum signal inputted into and processed by the despreading device 7, the referencesignal components in the received composite spread spectrum signal are prevented from interfering with the despreading process by the device 7. Accordingly, the reference-signal components in the received composite spread spectrum signal are prevented from adversely affecting the recovered information piece.

SECOND EMBODIMENT

Figure 3:
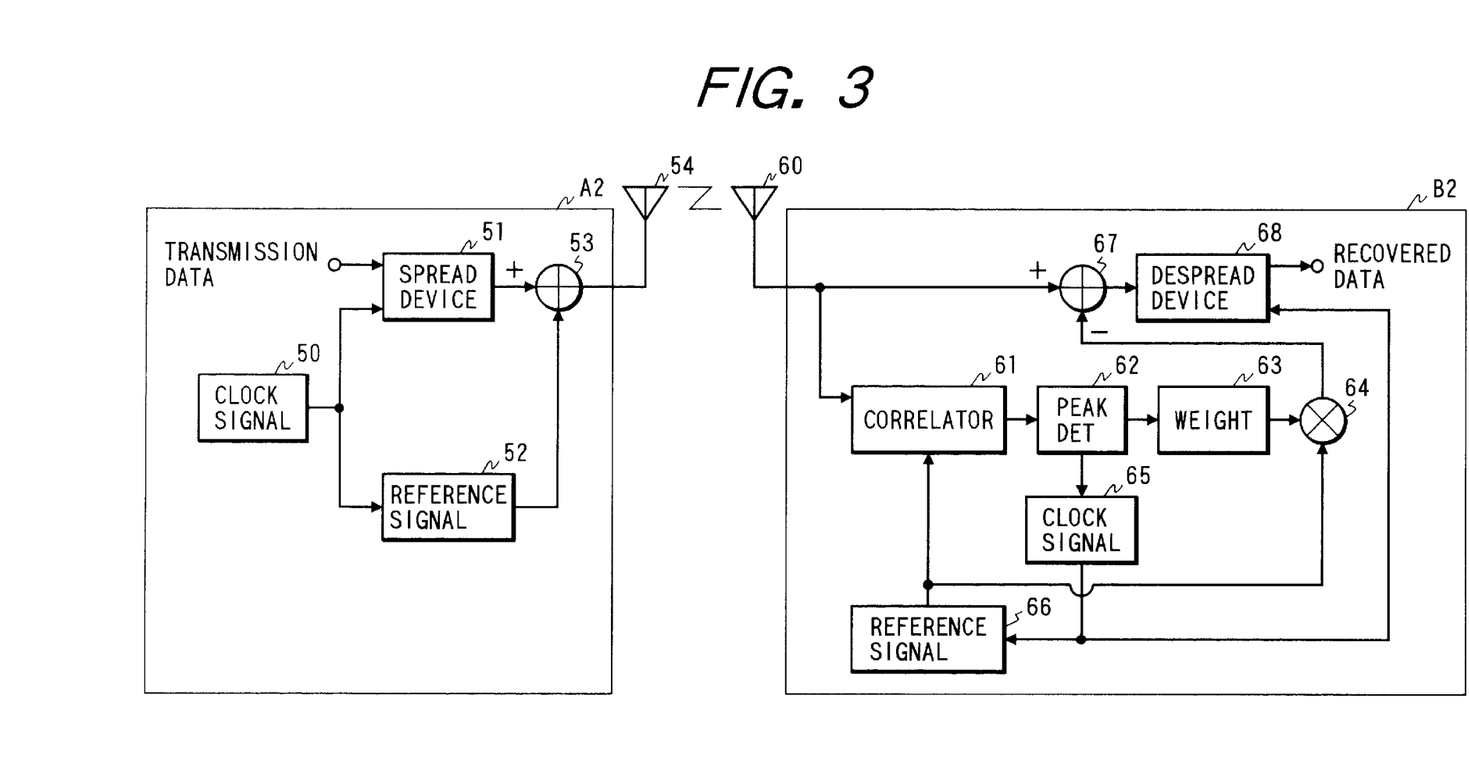
FIG. 3 is a diagram of a CDMA communication system according to a second embodiment of this invention.

With reference to FIG. 3, a CDMA communication system includes a base station provided with a transmitter "A2". There are a plurality of mobile stations each having a receiver "B2". It should be noted that FIG. 3 indicates only one of the mobile-station receivers "B2".

In the system of FIG. 3, the base-station transmitter "A2" includes a clock signal generator 50, a spreading device 51, a reference signal generator 52, and an adder 53. The clock signal generator 50 outputs a clock signal to the spreading device 51 and the reference signal generator 52. Transmission data pieces, that is, information pieces to be transmitted and addressed to the respective mobile stations, are fed to the spreading device 51.

The spreading device 51 includes pseudo-noise code generators (spread code generators) for producing different pseudo-noise codes (different spread codes) at timings which depend on the clock signal fed from the clock signal generator 50. The different spread codes are assigned to the mobile stations respectively. For example, the produced spread codes are selected from among maximum length codes (maximum length sequences). The spreading device 51 includes multipliers (mixers or modulators) which convert the information pieces into spread spectrum signals in response to the spread codes respectively. The spreading device 51 includes a summing circuit or an adder which combines the spread spectrum signals into a first composite spread spectrum signal. The spreading device 51 outputs the first composite spread spectrum signal to the adder 53.

The reference signal generator 52 produces a reference signal at a timing which depends on the clock signal fed from the clock signal generator 50. The produced reference signal is synchronous with the spread codes generated in the spreading device 51. The reference signal has a predetermined period which is in a given relation with the period of the spread codes. The reference signal is used for providing synchronization among all transmitters and receivers in the communication system. The reference signal is common to all the mobile stations while the spread codes are assigned to the mobile stations respectively. The reference signal generator 52 outputs the reference signal to the adder 53.

It is good that the reference signal has small degrees of correlations with the spread codes at all phase differences from the spread codes. For example, the reference signal is selected from among preferred pair maximum length codes.

The adder 53 combines the first composite spread spectrum signal and the reference signal into a second composite spread spectrum signal. The second composite spread spectrum signal is fed from the adder 53 to an antenna 54 via an RF modulator (not shown) before being radiated by the antenna 54.

In the system of FIG. 3, the mobile-station receiver "B2" includes a correlator 61, a peak detector 62, a weight coefficient generator 63, a multiplier 64, a clock signal generator 65, a reference signal generator 66, a subtracter 67, and a despreading device 68. The second composite spread spectrum signal transmitted from the base-station transmitter "A2" is caught by an antenna 60, and is then fed from the antenna 60 to the correlator 61 and the subtracter 67 via an RF demodulator (not shown).

The clock signal generator 65 outputs a clock signal to the reference signal generator 66 and the despreading device 68.

The reference signal generator 66 produces a reference signal at a timing which depends on the clock signal. The produced reference signal corresponds to the transmitter-side reference signal. The reference signal generator 66 outputs the reference signal to the correlator 61 and the multiplier 64.

The correlator 61 and the peak detector 62 compose a sync acquisition device. The correlator 61 detects the degree of correlation between the second composite spread spectrum signal and the reference signal. When the reference signal fed from the reference signal generator 66 matches in phase with the reference signal contained in the second composite spread spectrum signal, the degree of correlation between the second composite spread spectrum signal and the reference signal is maximized so that the output signal of the correlator 61 peaks. The peak detector 62 responds to the output signal of the correlator 61. The peak detector 62 has the function of detecting that the output signal of the correlator 61 peaks. The peak detector 62 generates a control signal in response to the output signal of the correlator 61. The peak detector 62 outputs the control signal to the clock signal generator 65.

The clock signal generator 65 is controlled by the control signal fed from the peak detector 62. During an initial stage of operation of the mobile-station receiver "B2", the phase of the clock signal generated by the clock signal generator 65, that is, the phase of the reference signal generated by the reference signal generator 66, is continuously varied as long as the control signal fed from the peak detector 62 represents that the output signal of the correlator 61 does not peak. The variation in the phase of the clock signal generated by the clock signal generator 65, that is, the phase of the reference signal generated by the reference signal generator 66, is stopped when the control signal fed from the peak detector 62 represents that the output signal of the correlator 61 peaks. In this way, the synchronization is acquired between the transmitter-side clock signal and the receiver-side clock signal.

The peak detector 62 feeds the weight coefficient generator 63 with a signal representing the maximum (peak) degree of correlation between the second composite spread spectrum signal and the reference signal fed from the reference signal generator 66. The weight coefficient generator 63 produces a signal of a weight coefficient in response to the signal fed from the peak detector 62. The weight coefficient generator 63 outputs the weight coefficient signal to the multiplier 64. The weight coefficient represented by the output signal of the weight coefficient generator 63 depends on the maximum correlation degree detected by the peak detector 62. The weight coefficient generator 63 includes, for example, a ROM storing data representing a table in which a set of different weight coefficients are plotted as a function of a maximum correlation degree.

The device 64 multiplies the reference signal and the weight coefficient signal, controlling a gain with respect to the reference signal in accordance with the weight coefficient represented by the weight coefficient signal. Thus, the multiplier 64 converts the reference signal into a level-adjusted reference signal in response to the weight coefficient signal. The multiplier 64 outputs the level-adjusted reference signal to the subtracter 67.

The device 67 subtracts the level-adjusted reference signal from the second composite spread spectrum signal, thereby removing the reference-signal components from the second composite spread spectrum signal. In other words, the subtracter 67 converts the second composite spread spectrum signal into a third composite spread spectrum signal which is substantially free from components related to the reference signal. The subtracter 67 outputs the third composite spread spectrum signal to the despreading device 68.

The despreading device 68 includes a pseudo-noise code generator (a spread code generator) for producing the pseudo-noise code (the spread code) at a timing which depends on the clock signal fed from the clock signal generator 65. In cases where the clock signal generated by the clock signal generator 65 is synchronous with the transmitter-side clock signal, the produced pseudo-noise code is synchronous with the pseudo-noise code contained in the composite spread spectrum signal fed from the subtracter 67 to the despreading device 68. The produced pseudonoise code is equal to that assigned to the present mobile station. The despreading device 68 includes a multiplier (a mixer or demodulator) which despreads and converts the third composite spread spectrum signal into the information piece in response to the pseudo-noise code. In this way, the information piece is recovered from the received composite spread spectrum signal. The recovered information piece is related to the spread code assigned to the present mobile station, and is thus addressed to the present mobile station. The despreading device 68 outputs the recovered information piece.

Since the subtracter 67 removes the reference-signal components from the composite spread spectrum signal inputted into and processed by the despreading device 68, the reference-signal components in the received composite spread spectrum signal are prevented from interfering with the despreading process by the device 68. Accordingly, the reference-signal components in the received composite spread spectrum signal are prevented from adversely affecting the recovered information piece.

THIRD EMBODIMENT

Figure 4:
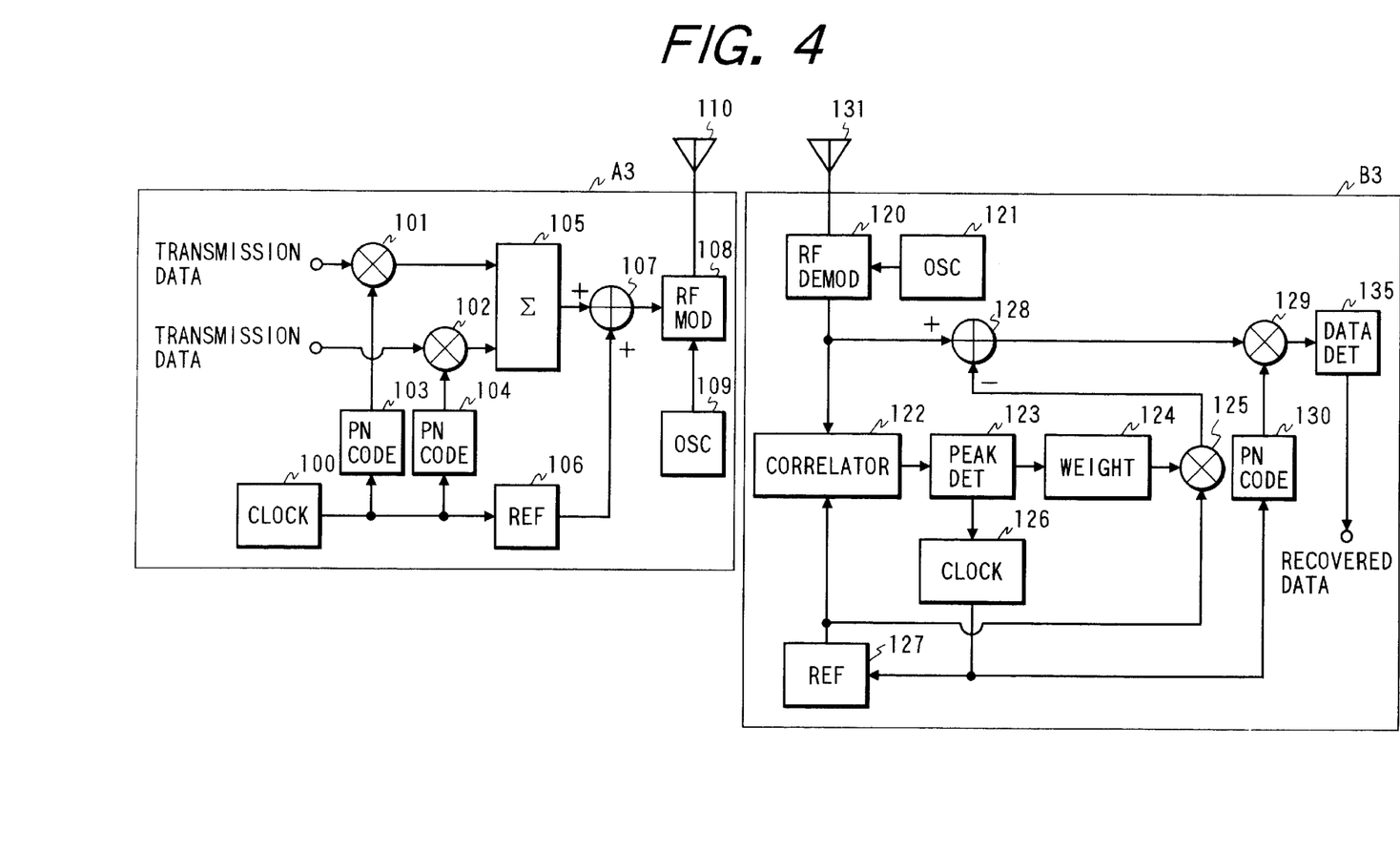
FIG. 4 is a diagram of a CDMA communication system according to a third embodiment of this invention.

With reference to FIG. 4, a CDMA communication system includes a base station provided with a transmitter "A3". There are a plurality of mobile stations each having a receiver "B3". It should be noted that FIG. 4 indicates only one of the mobile-station receivers "B3".

In the system of FIG. 4, the base-station transmitter "A3" includes a clock signal generator 100, multipliers 101 and 102, spread code generators (pseudo-noise code generators) 103 and 104, a summing circuit or an adder 105, a reference signal generator 106, an adder 107, an RF (radio frequency) modulator 108, and an oscillator 109. The clock signal generator 100 outputs a clock signal to the spread code generators 103 and 104, and the reference signal generator 106.

The multipliers 101 and 102, the spread code generators 103 and 104, and the summing circuit 105 compose a spreading device. Transmission data pieces, that is, information pieces to be transmitted and addressed to the respective mobile stations, are fed to the multipliers 101 and 102 respectively. The spread code generators 103 and 104 produce different pseudo-noise codes (different spread codes) at timings which depend on the clock signal fed from the clock signal generator 100. The different spread codes are assigned to the mobile stations respectively. For example, the produced spread codes are selected from among maximum length codes (maximum length sequences). The spread code generators 103 and 104 output the spread codes to the multipliers 101 and 102 respectively. The multipliers 101 and 102 convert the information pieces into spread spectrum signals in response to the spread codes respectively. The multipliers 101 and 102 output the spread spectrum signals to the summing circuit 105. The summing circuit 105 combines the spread spectrum signals into a first composite spread spectrum signal. The summing circuit 105 outputs the first composite spread spectrum signal to the adder 107.

The reference signal generator 106 produces a reference signal at a timing which depends on the clock signal fed from the clock signal generator 100. The produced reference signal is synchronous with the spread codes generated by the spread code generators 103 and 104. The reference signal has a predetermined period which is in a given relation with the period of the spread codes. The reference signal is used for providing synchronization among all transmitters and receivers in the communication system. The reference signal is common to all the mobile stations while the spread codes are assigned to the mobile stations respectively. The reference signal generator 106 outputs the reference signal to the adder 107. It is good that the reference signal has small degrees of correlations with the spread codes at all phase differences from the spread codes. For example, the reference signal is selected from among preferred pair maximum length codes.

The adder 107 combines the first composite spread spectrum signal and the reference signal into a second composite spread spectrum signal. The adder 107 outputs the second composite spread spectrum signal to the RF modulator 108.

The oscillator 109 outputs an RF carrier to the RF modulator 108. The RF modulator 108 modulates the RF carrier in accordance with the second composite spread spectrum signal, thereby converting the second composite spread spectrum signal into an RF spread spectrum signal. The RF spread spectrum signal is fed from the RF modulator 108 to an antenna 110 before being radiated by the antenna 110.

In the system of FIG. 4, the mobile-station receiver "B3" includes an RF demodulator 120, an oscillator 121, a correlator 122, a peak detector 123, a weight coefficient generator 124, a multiplier 125, a clock signal generator 126, a reference signal generator 127, a subtracter 128, and a multiplier 129, a pseudo-noise code generator 130, and a data detector 135. The RF spread spectrum signal transmitted from the base-station transmitter "A3" is caught by an antenna 131, and is then fed from the antenna 131 to the RF demodulator 120.

The oscillator 121 outputs an RF carrier to the RF demodulator 120. The RF carrier outputted from the oscillator 121 corresponds to the transmitter-side RF carrier. The RF demodulator 120 demodulates the RF spread spectrum signal into a second composite spread spectrum signal in response to the RF carrier. The RF demodulator 120 outputs the second composite spread spectrum signal to the correlator 122 and the subtracter 128.

The clock signal generator 126 outputs a clock signal to the reference signal generator 127 and the pseudo-noise code generator 130. The reference signal generator 127 produces a reference signal at a timing which depends on the clock signal. The produced reference signal corresponds to the transmitter-side reference signal. The reference signal generator 127 outputs the reference signal to the correlator 122 and the multiplier 125.

The correlator 122 and the peak detector 123 compose a sync acquisition device. The correlator 122 detects the degree of correlation between the second composite spread spectrum signal and the reference signal. When the reference signal fed from the reference signal generator 127 matches in phase with the reference signal contained in the second composite spread spectrum signal, the degree of correlation between the second composite spread spectrum signal and the reference signal is maximized so that the output signal of the correlator 122 peaks. The peak detector 123 responds to the output signal of the correlator 122. The peak detector 123 has the function of detecting that the output signal of the correlator 122 peaks. The peak detector 123 generates a control signal in response to the output signal of the correlator 122. The peak detector 123 outputs the control signal to the clock signal generator 126.

The clock signal generator 126 is controlled by the control signal fed from the peak detector 123. During an initial stage of operation of the mobile-station receiver "B3", the phase of the clock signal generated by the clock signal generator 126, that is, the phase of the reference signal generated by the reference signal generator 127, is continuously varied as long as the control signal fed from the peak detector 123 represents that the output signal of the correlator 122 does not peak. The variation in the phase of the clock signal generated by the clock signal generator 126, that is, the phase of the reference signal generated by the reference signal generator 127, is stopped when the control signal fed from the peak detector 123 represents that the output signal of the correlator 122 peaks. In this way, the synchronization is acquired between the transmitter-side clock signal and the receiver-side clock signal.

The peak detector 123 feeds the weight coefficient generator 124 with a signal representing the maximum (peak) degree of correlation between the second composite spread spectrum signal and the reference signal generated by the reference signal generator 127. The weight coefficient generator 124 produces a signal of a weight coefficient in response to the signal fed from the peak detector 123. The weight coefficient generator 124 outputs the weight coefficient signal to the multiplier 125. The weight coefficient represented by the output signal of the weight coefficient generator 124 depends on the maximum correlation degree detected by the peak detector 123. The weight coefficient generator 124 includes, for example, a ROM storing data representing a table in which a set of different weight coefficients are plotted as a function of a maximum correlation degree.

The device 125 multiplies the reference signal and the weight coefficient signal, controlling a gain with respect to the reference signal in accordance with the weight coefficient represented by the weight coefficient signal. Thus, the multiplier 125 converts the reference signal into a level-adjusted reference signal in response to the weight coefficient signal. The multiplier 125 outputs the level-adjusted reference signal to the subtracter 128.

The device 128 subtracts the level-adjusted reference signal from the second composite spread spectrum signal, thereby removing the reference-signal components from the second composite spread spectrum signal. In other words, the subtracter 128 converts the second composite spread spectrum signal into a third composite spread spectrum signal which is substantially free from components related to the reference signal. The subtracter 128 outputs the third composite spread spectrum signal to the multiplier 129.

The multiplier 129 and the pseudo-noise code generator 130 compose a despreading device. The pseudo-noise code generator 130 produces the pseudo-noise code (the spread code) at a timing which depends on the clock signal fed from the clock signal generator 126. In cases where the clock signal generated by the clock signal generator 126 is synchronous with the transmitter-side clock signal, the produced pseudo-noise code is synchronous with the pseudo-noise code contained in the composite spread spectrum signal fed from the subtracter 128 to the multiplier 129. The produced pseudo-noise code is equal to that assigned to the present mobile station. The spread code generator 130 outputs the pseudo-noise code to the multiplier 129. The multiplier 129 despreads and converts the third composite spread spectrum signal into an information-piece containing signal in response to the spread code. The multiplier 129 outputs the information-piece containing signal to the data detector 135. The device 135 detects the information piece from the output signal of the multiplier 129. In this way, the information piece is recovered from the received composite spread spectrum signal. The recovered information piece is related to the pseudo-noise code assigned to the present mobile station, and is thus addressed to the present mobile station. The data detector 135 outputs the recovered information piece.

Since the subtracter 128 removes the reference-signal components from the composite spread spectrum signal inputted into and processed by the multiplier 129, the reference-signal components in the received composite spread spectrum signal are prevented from interfering with the despreading process by the device 129. Accordingly, the reference-signal components in the received composite spread spectrum signal are prevented from adversely affecting the recovered information piece.

What is claimed is:

1. A CDMA communication system comprising:
    a base station transmitting a first spread spectrum signal which contains information and a reference signal for synchronization; and
    a mobile station receiving the first spread spectrum signal from the base station;
    wherein the mobile station comprises means for removing the reference signal from the received first spread spectrum signal to prevent the reference signal from interfering with recovery of the information, and converting the received first spread spectrum signal into a second spread spectrum signal, and means for despreading the second spread spectrum signal and recovering the information from the second spread spectrum signal.

2. A CDMA communication system comprising:
    a base station transmitting a first spread spectrum signal which contains information and a first reference signal for synchronization; and
    a mobile station receiving the first spread spectrum signal from the base station;
    wherein the mobile station comprises means for generating a second reference signal corresponding to the first reference signal, means for detecting a degree of correlation between the received first spread spectrum signal and the second reference signal, means for weighting the second reference signal in response to the detected degree of correlation and converting the second reference signal into a third reference signal, means for subtracting the third reference signal from the received first spread spectrum signal and converting the received first spread spectrum signal into a second spread spectrum signal, and means for despreading the second spread spectrum signal and recovering the information from the second spread spectrum signal.

3. A mobile-station receiver in a CDMA communication system including a base station transmitting a first spread spectrum signal which contains information and a reference signal for synchronization, the mobile-station receiver comprising:

means for receiving the first spread spectrum signal from the base station;

means for removing the reference signal from the received first spread spectrum signal to prevent the reference signal from interfering with recovery of the information, and converting the received first spread spectrum signal into a second spread spectrum signal; and     means for despreading the second spread spectrum signal and recovering the information from the second spread spectrum signal.

4. A mobile-station receiver in a CDMA communication system including a base station transmitting a first spread spectrum signal which contains information and a first reference signal for synchronization, the mobile-station receiver comprising:

means for receiving the first spread spectrum signal from the base station;

means for generating a second reference signal corresponding to the first reference signal;

means for detecting a degree of correlation between the received first spread spectrum signal and the second reference signal;

means for weighting the second reference signal in response to the detected degree of correlation and converting the second reference signal into a third reference signal;

means for subtracting the third reference signal from the received first spread spectrum signal and converting the received first spread spectrum signal into a second spread spectrum signal; and     means for despreading the second spread spectrum signal and recovering the information from the second spread spectrum signal.

* * * * *